(12) United States Patent
Allgaier et al.

(10) Patent No.: US 8,509,977 B2
(45) Date of Patent: Aug. 13, 2013

(54) METHOD FOR OPERATING A DRIVE TRAIN

(75) Inventors: Bernd Allgaier, Kressbronn (DE);
Friedrich Tenbrock, Langenargen (DE);
Michael Gromus, Eriskirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 432 days.

(21) Appl. No.: 13/055,283

(22) PCT Filed: Jul. 16, 2009

(86) PCT No.: PCT/EP2009/059167
§ 371 (c)(1),
(2), (4) Date: Jan. 21, 2011

(87) PCT Pub. No.: WO2010/010041
PCT Pub. Date: Jan. 28, 2010

(65) Prior Publication Data
US 2011/0130911 A1 Jun. 2, 2011

(30) Foreign Application Priority Data
Jul. 24, 2008 (DE) .................. 10 2008 040 662

(51) Int. Cl.
*B60L 9/00* (2006.01)

(52) U.S. Cl.
USPC .................. 701/22; 701/67; 701/87

(58) Field of Classification Search
USPC .............................. 701/22, 67, 87
See application file for complete search history.

(56) References Cited

U.S. PATENT DOCUMENTS

| | | | |
|---|---|---|---|
| 5,614,809 A | 3/1997 | Kiuchi et al. | |
| 5,667,458 A * | 9/1997 | Narita et al. | 477/169 |
| 6,066,069 A * | 5/2000 | Vorndran | 477/38 |
| 6,139,472 A * | 10/2000 | Harada et al. | 477/169 |
| 6,951,528 B2 * | 10/2005 | Ewinger et al. | 477/195 |
| 7,206,683 B2 * | 4/2007 | Billig | 701/69 |
| 8,065,065 B2 * | 11/2011 | Satou et al. | 701/68 |
| 8,180,549 B2 * | 5/2012 | Leibbrandt et al. | 701/87 |
| 2001/0042647 A1 | 11/2001 | Sakamoto et al. | |
| 2004/0060753 A1 | 4/2004 | Ito et al. | |
| 2004/0084907 A1 | 5/2004 | Kuribayashi et al. | |
| 2004/0157704 A1 | 8/2004 | Stork et al. | |
| 2008/0064561 A1 * | 3/2008 | Popp et al. | 477/5 |
| 2008/0318731 A1 | 12/2008 | Denis | |
| 2009/0131223 A1 * | 5/2009 | Kulbe | 477/176 |
| 2010/0056328 A1 | 3/2010 | Schenk et al. | |

FOREIGN PATENT DOCUMENTS

| | | |
|---|---|---|
| DE | 102 28 709 A1 | 2/2003 |
| DE | 10 2004 024 213 A1 | 12/2005 |
| DE | 10 2006 048 358 A1 | 4/2008 |

(Continued)

*Primary Examiner* — Hussein A. Elchanti
(74) *Attorney, Agent, or Firm* — Davis & Bujold, PLLC

(57) ABSTRACT

A method of operating a drivetrain of a motor vehicle which comprises a hybrid drive with a combustion engine coupled by a clutch to an electric motor. To start the combustion engine with the electric motor, the clutch is partially engaged to a slipping condition to deliver electric motor torque from a starting value, the torque transmitted by the clutch is increased to a first final value. If during this, the combustion engine begins turning, the break-away torque of the internal combustion engine is determined. If the combustion engine does not begin turning, the clutch is further engaged to a slipping condition starting from a second initial value, such that torque transmitted by the clutch increases linearly until the combustion engine begins turning, and the break-away torque of the internal combustion engine is determined from the clutch torque at which the combustion engine begins turning.

12 Claims, 2 Drawing Sheets

(56) References Cited

FOREIGN PATENT DOCUMENTS

| EP | 0 698 522 | A1 | 2/1996 |
| EP | 1 122 110 | A2 | 8/2001 |
| EP | 1 418 325 | A2 | 5/2004 |
| WO | 20061106254 | A2 | 10/2006 |

* cited by examiner

METHOD FOR OPERATING A DRIVE TRAIN

This application is a National Stage completion of PCT/EP2009/059167 filed Jul. 16, 2009, which claims priority from German patent application serial no. 10 2008 040 662.7 filed Jul. 24, 2008.

FIELD OF THE INVENTION

The invention concerns a method for operating a drive train of a motor vehicle that comprises at least a transmission and a hybrid drive.

BACKGROUND OF THE INVENTION

The main components of a drive train of a motor vehicle are a drive assembly and a transmission. The transmission converts torques and speeds, and thus transmits the traction force produced by the drive assembly. The present invention concerns a method for operating a drive train that comprises at least a transmission and, as the drive assembly, a hybrid drive with an internal combustion engine and an electric motor.

In a drive train with a so-termed parallel hybrid drive, a clutch is connected between the internal combustion engine and the electric motor of the hybrid drive, by means of which the internal combustion engine of the hybrid drive can be uncoupled from a drive output of the drive train. When such a drive train with a parallel hybrid drive is started, the internal combustion engine is typically switched off and the clutch connected between the internal combustion engine and the electric motor is disengaged.

When the switched-off internal combustion engine is to be started, it can be entrained into motion by the electric motor by at least partially engaging the clutch connected between the internal combustion engine and the electric motor, and to optimally carry out the entrainment of the not yet ignited internal combustion engine, at least the so-termed break-away torque and preferably also the so-termed friction torque of the internal combustion engine must be known. Until now these torques have been specified by the engine manufacturer and entrainment is then carried out on the basis of the specified torques.

However, this fails to take into account that the break-away and friction torques of the internal combustion engine can change over its operating life. This results in sub-optimal entrainment of the internal combustion engine.

SUMMARY OF THE INVENTION

Starting from there the purpose of the present invention is to address the problem of providing a new type of method for operating a drive train that comprises a transmission and a hybrid drive.

According to this, when the internal combustion engine is entrained into motion the clutch connected between the non-ignited internal combustion engine and the electric motor that delivers a constant electric motor torque is engaged as far as a slipping condition in such manner that, as a function of time, the clutch torque transmitted by the clutch is increased linearly between a first initial value and a first final value, and when during this the non-ignited internal combustion engine begins turning, the break-away torque is determined from the clutch torque at which the non-ignited internal combustion engine begins turning, whereas if during this the non-ignited internal combustion engine does not begin turning, the clutch connected between the non-ignited internal combustion engine and the electric motor is engaged to a slipping condition where, as a function of time and starting from a second initial value, the clutch torque transmitted by the clutch is increased linearly until the non-ignited internal combustion engine begins turning, and the break-away torque of the internal combustion engine is determined from the clutch torque at which the internal combustion engine begins turning.

According to a second aspect of the invention, when the internal combustion engine is entrained into motion the clutch connected between the non-ignited internal combustion engine and the electric motor is engaged completely and, starting from a first initial value and as a function of time, the electric motor torque delivered by the electric motor is increased linearly up to a first final value, and when during this the non-ignited internal combustion engine begins turning, the break-away torque of the internal combustion engine is determined from the electric motor torque at which the non-ignited internal combustion engine begins turning, whereas if during this the non-ignited internal combustion engine does not begin turning, then starting from a second initial value the electric motor torque delivered by the electric motor is increased linearly until the non-ignited internal combustion engine begins turning, and the break-away torque of the internal combustion engine is determined from the electric motor torque at which the internal combustion engine begins turning.

By virtue of the invention, during the entrainment at least the break-away torque and preferably also the so-termed friction torque of the internal combustion engine can be determined and thus adapted over the operational life, in order always to ensure optimal entrainment of the internal combustion engine.

BRIEF DESCRIPTION OF THE DRAWINGS

Preferred further developments of the invention emerge from the subordinate claims and the description given below. Example embodiments of the invention, to which it is not limited, are explained in more detail with reference to the drawing, which shows:

DETAILED DESCRIPTION OF THE PREFERRED EMBODIMENTS

The present invention concerns a method for operating a drive train of a motor vehicle, which comprises at least a transmission and a hybrid drive.

Figure 1:
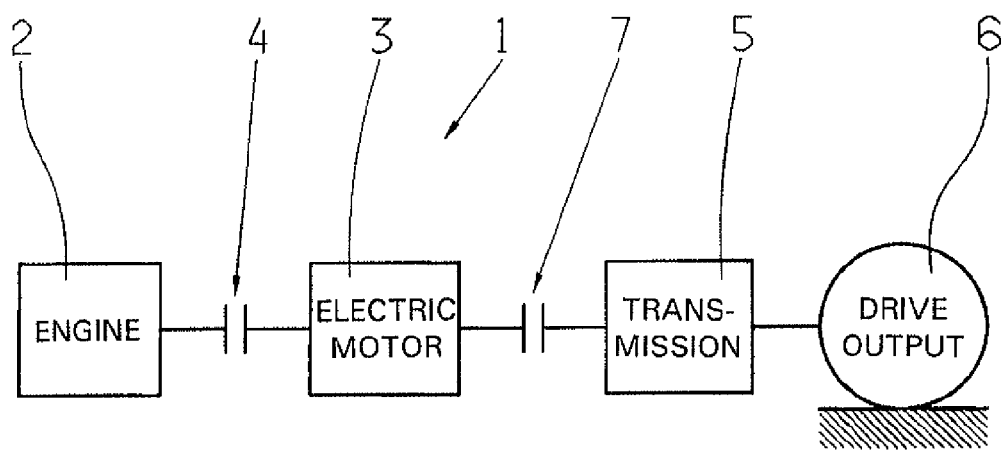
FIG. 1: Drive train layout of a motor vehicle, with which the method according to the invention can be implemented

FIG. 1 shows an example of a drive train of a motor vehicle, with which the method according to the invention can be implemented. Thus, FIG. 1 shows the layout of a drive train 1 of a motor vehicle, the drive train 1 according to FIG. 1 comprising a hybrid drive consisting of an internal combustion engine 2 and an electric motor 3. Between the internal combustion engine 2 and the electric motor 3 is connected a clutch 4, which is disengaged when the drive train 1 is powered exclusively by the electric motor 3.

Besides the hybrid drive, the drive train 1 of FIG. 1 also comprises a transmission 5 which transmits the traction force provided by the hybrid drive to a drive output 6 of the drive train, namely, wheels to be driven. The transmission can be made, for example, as an automatic or an automated transmission. In an automatic transmission gearshifts are carried out without traction force interruption, while in an automated transmission they take place with traction force interruption.

In the drive train of FIG. 1, a further clutch 7 is connected between the electric motor 3 of the hybrid drive and the transmission 5. This clutch 7 serves as a transmission-external starting element when starting under electric motor power.

Figure 2:
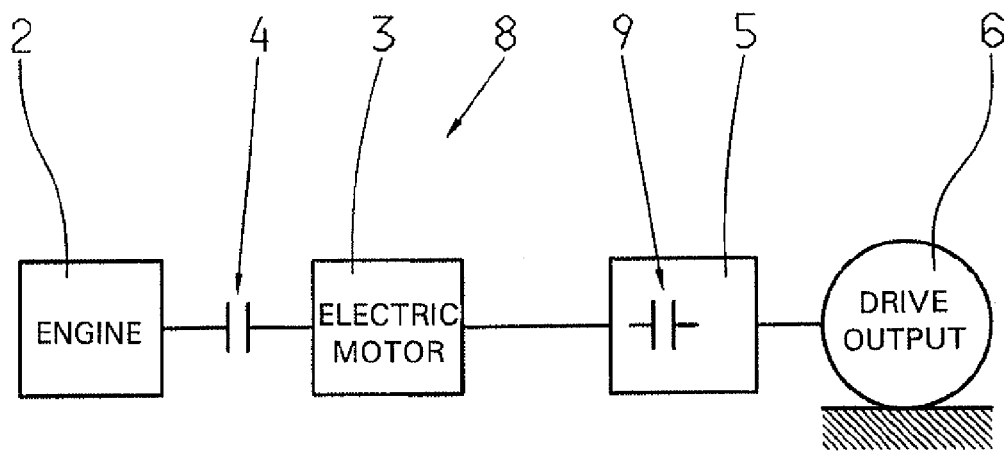
FIG. 2: An alternative drive train layout of a motor vehicle, with which the method according to the invention can be implemented

FIG. 2 shows as an example another drive train layout of a motor vehicle, with which the method according to the invention can be used, the drive train 8 of the drive train layout in FIG. 2 differing from the drive train 1 of the drive train layout in FIG. 1 in that the clutch 7 or transmission-external starting element is omitted and replaced by a transmission-internal starting element 9.

The present invention concerns a method for operating such a drive train with a transmission and a hybrid drive, namely the details thereof that concern the entrainment into motion of a switched-off, non-ignited internal combustion engine 2 with the help of the electric motor 3 of the hybrid drive.

Figure 3:
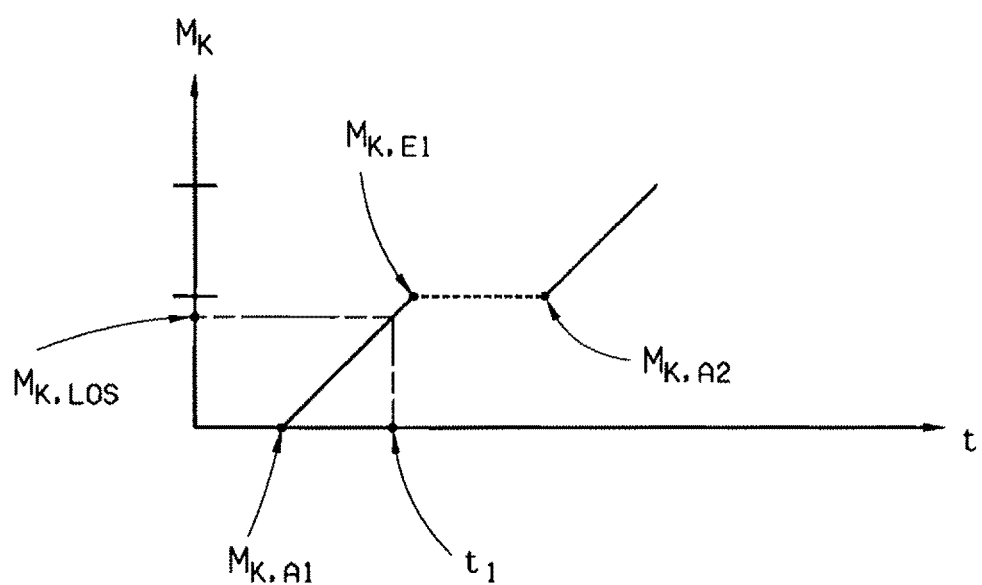
FIG. 3: Diagram illustrating the method according to the invention

According to a first aspect of the present invention, when the internal combustion engine 2 is entrained into motion by the electric motor 3, the clutch 4 connected between the non-ignited internal combustion engine 2 and the electric motor 3 that delivers a constant electric motor torque is engaged as far as a slipping condition, namely in such manner that as a function of time and starting from a first initial value, the clutch torque transmitted by the clutch is increased linearly up to a first final value. In FIG. 3 the torque $M_K$ transmitted by the clutch 4 is plotted against time t, and from FIG. 3 it can be seen that as a function of time t, progressive engagement of the clutch 4 while maintaining the slip increases the clutch torque $M_K$ transmitted by the clutch, starting from the first initial value $M_{K,A1}$, up to the first final value $M_{K,E1}$, along a ramp in a linear manner.

During this, when the non-ignited internal combustion engine 2 begins turning, the break-away torque of the internal combustion engine 2 is determined from the clutch torque $M_K$ at which the non-ignited internal combustion engine 2 starts turning.

In FIG. 3 it is assumed that the non-ignited internal combustion engine begins turning at a time $t_1$, so the break-away torque of the internal combustion engine 2 is determined from the clutch torque $M_{K,LOS}$ transmitted by the clutch 4 at that time $t_1$.

Now if, during the linear increase of the clutch torque $M_K$ transmitted by the clutch 4 from the first initial value $M_{K,A1}$ toward the first final value $M_{K,E1}$, the internal combustion engine 2 does not start turning, the clutch 4 between the internal combustion engine 2 and the electric motor 3 is engaged while still slipping in such manner that, as a function of time t, the clutch torque transmitted by the clutch 4 increases linearly starting from a second initial value $M_{K,A2}$, until the non-ignited internal combustion engine 2 begins running.

From the clutch torque $M_K$ at which the internal combustion engine 2 begins turning, again the break-away torque of the internal combustion engine 2 is determined. The second initial value $M_{K,A2}$ is preferably larger than the first final value $M_{K,E1}$ but it can also be smaller or larger than the first final value. In all cases, however, the second initial value $M_{K,A2}$ is larger than the first initial value $M_{K,A1}$.

Furthermore, it is consistent with the present invention that when, in the above manner, the internal combustion engine 2 is entrained by the electric motor 3 and the break-away torque of the internal combustion engine 2 is determined, on the basis of the break-away torque of the internal combustion engine 2 so determined, the first final value $M_{K,E1}$ is adapted, and for this purpose the break-away torque of the internal combustion engine 2 is modified by means of a safety offset value in order then to adapt the first final value $M_{K,E1}$ as a function thereof.

Then, when during the increase of the clutch torque $M_K$ starting from the first initial value $M_{K,A1}$ the non-ignited internal combustion engine 2 begins running, the first final value $M_{K,E1}$ is adapted preferably in such manner that as the new first final value, the value obtained from the break-away torque as modified with the safety offset value is used. When during the increase of the clutch torque starting from the second initial value $M_{K,A2}$ the non-ignited internal combustion engine 2 begins turning, the first final value is preferably adapted in such manner that the torque determined from the break-away torque and the safety offset value is modified with the previous first value to determine the new first final value in the sense of a weighted sum.

Accordingly, by virtue of the present invention, with the help of the break-away torque of the internal combustion engine 2 determined during its entrainment the first final value $M_{K,E1}$ can be adapted continuously, so that optimum entrainment of the internal combustion engine 2 by the electric motor 3 is made possible over the entire life of the motor vehicle.

When the internal combustion engine is turning over but not ignited, its friction torque can be determined by computing the following torque balance:

$$M_{VM,REIB} = M_K - J_{GES1} * \frac{d}{dt}(w(t)),$$

in which $M_{VM,REIB}$ is the friction torque of the internal combustion engine 2, $M_K$ is the clutch torque transmitted by the slipping clutch 4 connected between the internal combustion engine 2 and the electric motor 3, $J_{GES1}$ is the moment of inertia of the drive train as far as the slipping clutch 4 and w is the angular velocity of the internal combustion engine 2.

According to a second aspect of the present invention, the break-away torque and friction torque of the internal combustion engine 2 are determined for adaptation with the clutch 4 fully engaged, so that starting from a first initial value the electric motor torque $M_{EM}$ delivered by the electric motor 3 is increased linearly toward a first final value. The method according to the invention then proceeds analogously to the first aspect of the present invention, except in that in the first aspect of the invention the electric motor 3 delivers a constant electric motor torque and the clutch 4 transmits a variable clutch torque, whereas according to the second aspect of the invention the clutch 4 transmits a constant clutch torque while the electric motor torque delivered by the electric motor increases linearly so that the break-away torque and the friction torque of the internal combustion engine 2 can be determined. The break-away torque of the internal combustion engine 2 is then determined from the electric motor torque delivered by the electric motor 3, at which the non-ignited internal combustion engine 2 begins turning. As regards all other details, reference can be made to the first aspect of the invention.

According to the second aspect of the invention, when the internal combustion engine is turning but not ignited, its friction torque can be determined by computing the following torque balance:

$$M_{VM,REIB} = M_{EM} - J_{GES2} * \frac{d}{dt}(w(t)),$$

in which $M_{VM,REIB}$ is the friction torque of the internal combustion engine, $M_{EM}$ is the electric motor torque believed by the electric motor, $J_{GES2}$ is the moment of inertia of the drive train and w is the angular velocity of the internal combustion engine.

If the drive train comprises a starting element 7 or 9 which is in a slipping condition, the moment of inertia $J_{GES2}$ corresponds to the moment of inertia of the drive train as far as the slipping starting element 7 or 9. On the other hand, if there is no starting element the moment of inertia $J_{GES2}$ is the moment of inertia of the drive train as a whole.

Accordingly, in the sense of the present invention the break-away torque of the internal combustion engine 2 and in addition, preferably also its friction torque, can be determined and adapted in an operating-situation-dependent manner, to enable the entrainment of the internal combustion engine 2 by the electric motor 3 to be carried out optimally.

| Indexes | |
|---|---|
| 1 | Drive train |
| 2 | Internal combustion engine |
| 3 | Electric motor |
| 4 | Clutch |
| 5 | Transmission |
| 6 | Drive output |
| 7 | Clutch/transmission-external starting element |
| 8 | Drive train |
| 9 | Transmission-internal starting element |

The invention claimed is:

1. A method of operating a drivetrain of a motor vehicle, the drivetrain comprising at least a hybrid drive with an internal combustion engine and an electric motor, a clutch connected between the internal combustion engine and the electric motor, the internal combustion engine being an ignited internal combustion engine when operating and being a non-ignited internal combustion engine when not operating, a transmission arranged between the hybrid drive and a drive output, and either a transmission-internal or a transmission-external starting element, the method comprising the steps of:

partially engaging the clutch connected between the non-ignited internal combustion engine and the electric motor delivering a constant electric motor torque to a slipping condition to entrain the internal combustion engine into motion with help of the electric motor such that as a function of time and starting from a first initial value, the clutch torque transmitted by the clutch is increased linearly up to a first final value;

determining a break-away torque of the internal combustion engine, if the non-ignited internal combustion engine begins turning during the linear increase of the clutch torque transmitted by the clutch up to the first final value; and further engaging the clutch, connected between the non-ignited internal combustion engine and the electric motor, to a slipping condition as a function of time and starting from a second initial value, if the non-ignited internal combustion engine does not begin turning during the linear increase of the clutch torque transmitted by the clutch up to the first final value, such that the clutch torque transmitted by the clutch is increased linearly until the non-ignited internal combustion engine begins turning, and determining the break-away torque of the internal combustion engine from the clutch torque at which the internal combustion engine begins turning.

2. The method according to claim 1, further comprising the step of defining the second initial value as being larger than the first initial value and larger than the first final value.

3. The method according to claim 1, further comprising the step of modifying the break-away torque of the internal combustion engine determined by a safety offset value, and adapting the first final value as a function of the torque determined thereby.

4. The method according to claim 3, further comprising the step of adapting the first final value in such manner that the torque determined from the break-away torque and the safety offset value is used as a new first final value when, as the clutch torque is increased starting from a first initial value, the non-ignited internal combustion engine begins turning.

5. The method according to claim 3, further comprising the step of adapting the first final value in such manner that the torque determined from the break-away torque and the safety offset value is modified by a previous first final value to determine a new first final value when, as the clutch torque is increased from the second initial value, the non-ignited internal combustion engine begins turning.

6. The method according to claim 1, further comprising the step of determining the friction torque when the internal combustion engine is turning over but not ignited, by computing the following torque balance:

$$M_{VM,REIB} = M_K - J_{GES1} * \frac{d}{dt}(w(t)),$$

where $M_{VM,REIB}$ is the friction torque of the internal combustion engine, $M_K$ is the clutch torque transmitted by the slipping clutch connected between the internal combustion engine and the electric motor, $J_{GES1}$ is a moment of inertia of the drivetrain as far as the slipping clutch, and w is angular velocity of the internal combustion engine.

7. A method for operating a drivetrain of a motor vehicle, the drivetrain comprising at least a hybrid drive with an internal combustion engine and an electric motor, a clutch connected between the internal combustion engine and the electric motor, the internal combustion engine being an ignited internal combustion engine when operating and being a non-ignited internal combustion engine when not operating, a transmission arranged between the hybrid drive and a drive output, and either a transmission-internal or a transmission-external starting element, the method comprising the steps of:

completely engaging the clutch, connected between the non-ignited internal combustion engine and the electric motor, when the internal combustion engine is entrained into motion with aid of the electric motor;

increasing the electric motor torque delivered by the electric motor up to a first final value, as a function of time and starting from a first initial value;

determining a break-away torque of the internal combustion engine from the electric motor torque at which the non-ignited internal combustion engine begins turning, if the non-ignited internal combustion engine begins turning during the increase of the electric motor torque delivered by the electric motor up to a first final value; and increasing linearly the electric motor torque, delivered by the electric motor, starting from a second initial value until the non-ignited internal combustion engine begins turning, if the non-ignited internal combustion engine does not begin turning during the increase of the electric motor torque delivered by the electric motor up to a first final value, and determining the break-away torque of the internal combustion engine from the electric motor torque at which the internal combustion engine begins turning.

8. The method according to claim 7, further comprising the step of defining the second initial value as being larger than the first initial value and larger than the first final value.

9. The method according to claim 7, further comprising the step of modifying the break-away torque of the internal combustion engine by a safety offset value, and adapting the first final value as a function of the torque determined thereby.

10. The method according to claim 9, further comprising the step of adapting the first final value such that the torque determined from the break-away torque and the safety offset value is used as a new first final value, when, starting from the first initial value, the electric motor torque is increased and the non-ignited internal combustion engine begins turning.

11. The method according to claim 9, further comprising the step of adapting the first final value such that the torque determined from the break-away torque and the safety offset value is modified with the previous first final value to determine the new first final value, when, during the increase of the electric motor torque starting from the second initial value, the non-ignited internal combustion engine begins turning.

12. The method according to claim 7, further comprising the step of determining the friction torque of the internal combustion engine when the internal combustion engine is turning but not ignited, by computing the following torque balance:

$$M_{VM,REIB} = M_{EM} - J_{GES2} * \frac{d}{dt}(w(t)),$$

where $M_{VM, REIB}$ is the friction torque of the internal combustion engine, $M_{EM}$ is the electric motor torque delivered by the electric motor, $J_{GES2}$ is a moment of inertia of the drivetrain, and w is angular velocity of the internal combustion engine.

* * * * *